Feb. 23, 1932.  J. H. WIGGINS  1,846,506
BREATHER TYPE ROOF FOR STORAGE TANKS FOR GAS AND VOLATILE LIQUIDS
Filed April 3, 1929
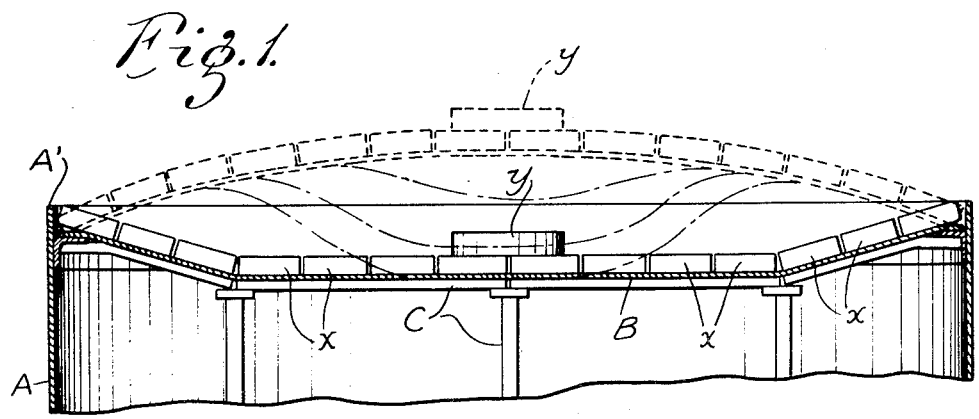
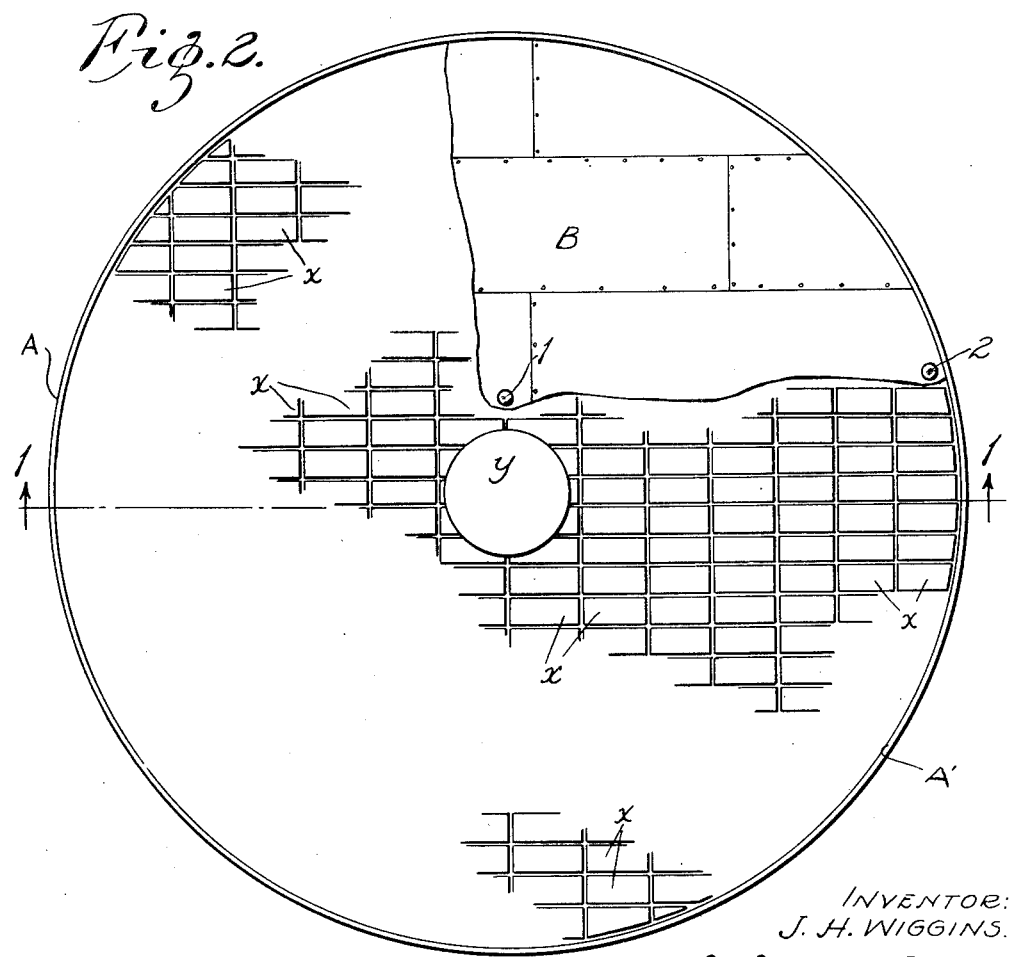
INVENTOR:
J. H. WIGGINS.
By Bakewell & Cherel
ATTORNEYS.

Patented Feb. 23, 1932

1,846,506

UNITED STATES PATENT OFFICE

JOHN H. WIGGINS, OF TULSA, OKLAHOMA

BREATHER TYPE ROOF FOR STORAGE TANKS FOR GAS AND VOLATILE LIQUIDS

Application filed April 3, 1929. Serial No. 352,168.

This invention relates to storage tanks for gases and volatile liquids, and particularly, storage tanks of the type that are equipped with a roof or top of the "breather type", i. e., a roof that is capable of flexing upwardly and downwardly a limited distance from a horizontal plane so as to increase and decrease the vapor space of the tank without liability of setting up injurious strains in the roof. In a tank roof of the general type mentioned, when the internal pressure of the tank becomes greater than the weight of the roof, due to the expansion of the gases or vapors in the tank, the roof will flex upwardly, and thus increase the volume of the vapor space in the tank. Thereafter, when the internal pressure of the tank diminishes, the roof will flex downwardly, thus automatically decreasing the volume of the gas or vapor space. Normally, the roof occupies a downwardly deflected position, and at such times the roof is sustained by a stationary supporting structure inside of the tank. When the internal pressure of the tank becomes greater than the weight of the roof, due to the expansion of the gases and vapors in the tank, the roof flexes upwardly more or less, according to the upward pressure that is exerted on the underside of the roof.

Owing to the fact that the roof is constructed from metal plates connected together in such a way as to form a limber sheet or diaphragm whose central portion is free to move upwardly and downwardly relatively to the peripheral edge of the roof which is attached to the side wall of the tank or to a vertically movable annular rim that surrounds the roof, considerable noise is produced when the roof is moving or flexing, due to the wrinkling, buckling or bending of the metal plates from which the roof is constructed. Another inherent characteristic of a breather type roof is that it is apt to assume a very irregular or uneven shape if a considerable load of rain water is standing on the roof when the roof flexes upwardly, such a load often causing the roof to buckle in such a way that the rain water will become trapped on a low point of the roof located intermediate the center of the roof and the peripheral edge of the roof, thereby decreasing the gas holding capacity of the tank by preventing the roof from rising to its full capacity. Accordingly, it has heretofore been necessary to equip breather type tank roofs with some kind of a drainage system for effecting the removal of rain water that falls on the roof, in order to insure the roof functioning properly.

One object of my invention is to provide a tank roof of the breather type which is equipped with a novel means for reducing the sound or noise produced by the flexing, bending or buckling of the metal plates from which the roof is constructed, when the roof is in motion.

Another object is to provide a tank roof of the breather type that is equipped with a novel means for decreasing the snap-like bending of the roof plates during the movement of the roof.

Another object is to provide a metal tank roof of the breather type that is equipped with a novel means for causing the roof to maintain a certain approximate shape as it rises and falls.

And still another object is to provide a metal tank roof of the breather type which is of such construction that when it rises or flexes upwardly, any rain water which may be standing on the roof will be expelled or thrown off the roof before the roof reaches such a position that the roof plates become tight or are placed under considerable tension.

In order to reduce the sound or noise produced by the bending, flexing or wrinkling of the roof plates, I propose to cover the top side of the roof with a material that will dampen or stop vibrations in the roof and deaden or absorb the noise produced by the movement of the roof, and which is also of such a character that it will not interfere with or prevent the roof plates from flexing sufficiently to permit the roof to function properly; said material is also of such a character that it will not be injuriously affected by the flexing or movement of the roof. While various materials may be used to constitute the sound deadening means of the roof, I prefer to use a non-metallic material which is of sufficient weight to decrease the vibrations and snap-like bending of the roof plates, during the movement of the roof.

In order to control the shape of the roof and cause it to assume a more or less definite or approximate shape when it rises and falls, even though considerable rain water is standing on the roof, I arrange a load of considerable weight but of relatively small area on the central portion of the roof, so as to hold the central portion of the roof down and prevent it from rising when the upward force or pressure exerted on the underside of the roof becomes great enough to cause the roof to start to move upwardly. By constructing the roof in this manner I control the shape of the roof when it moves upwardly and cause the roof to assume such a form during the first portion of the upward movement of the roof that a pocket or depression is provided at the center of the roof into which rain water standing on the roof will drain. During the continued upward movement of the roof this pocket or depression flattens out, thereby causing the rain water that has collected at the center of the roof to be discharged radially towards the peripheral edge of the roof and completely expelled from the roof by the time the roof reaches its upper or inverted position. Accordingly, I am able to dispense with a drainage system for removing rain water from the top side of the roof, thereby reducing the cost of building and maintaining the roof in operative condition.

The sound deadening means and the shape controlling means above described can be used independently of each other, but I prefer to equip the roof with both of said means.

Figure 1 of the drawings is a vertical transverse sectional view of a storage tank equipped with a breather type roof constructed in accordance with my invention; and Figure 2 is a top plan view of said tank.

Referring to the drawings which illustrate the preferred form of my invention, A designates the side wall of a tank that is used for storing gases or volatile liquids and B designates a roof or top of the breather type whose peripheral edge is connected by a gas-tight joint to the side wall of the tank. Said roof B is composed of metal plates connected together so as to form a limber sheet or flexible diaphragm that covers the entire area of the tank and which is capable of flexing upwardly and downwardly a limited distance from a horizontal plane so as to increase and decrease the vapor space of the tank without liability of setting up injurious strains in the roof. When the internal pressure of the tank becomes greater than the weight of the roof, due to the expansion of the gases or vapors in the tank, the roof will flex upwardly, as indicated by dotted lines in Figure 1, thereby increasing the volume of the vapor space in the tank. Thereafter, when the internal pressure of the tank diminishes, the roof will flex downwardly, thereby automatically decreasing the volume of the gas or vapor space. Normally, the roof B occupies a downwardly deflected position, as shown in full lines in Figure 1, and at such times the roof is sustained by a stationary supporting structure C inside of the tank, said supporting structure C being of such shape that the roof will either be of substantially inverted frusto-conical form, as herein shown, when it is in its deflected position, or of such shape that the roof will be of inverted conical form when it is in its deflected position, as illustrated in my prior U. S. Patent No. 1,645,313, dated October 11, 1927. As is usual in tank roofs of the breather type, the roof is equipped with a volume control pressure relief valve, shown diagrammatically in Figure 2 and designated by the reference character 1, that opens automatically and permits gases and vapors to escape from the tank when the roof reaches a certain position in its upward movement. The roof is also equipped with an inlet valve or vacuum valve, shown diagrammatically in Figure 2 and designated by the reference character 2, that opens automatically and admits air or gas to the tank when the roof reaches a certain position in its downward movement.

As shown in the drawings, a layer of non-metallic material is placed on the top side of the roof B, so as to decrease the vibrations and snap-like bending of the roof plates produced by the flexing, bending or wrinkling of the roof and also to decrease the sound and noise produced by the flexing of the roof. Various kinds of non-metallic material may be used for this purpose, but I prefer to arrange a layer of brick $x$ on the top side of the roof over substantially the entire area of the roof in such a way that the plates can bend or flex sufficiently to permit the roof to function properly. The brick $x$ are either laid with slight spaces between them, or if desired, they can be laid on the roof with a highly flexible or semi-liquid binder filling the spaces or joints between the brick. In either of the above described methods of installation, the means employed to constitute the load on the top side of the roof, is made up of a large number of independent units that are capable of moving independently of and relatively to each other when the roof plates flex, whereby the loading means on the roof, will not be ruptured or broken by the flexing of the roof plates. As shown in Figure 1, the upper edge portion of the side wall of the tank is extended upwardly a slight distance above the roof B so as to form a rim A' at the peripheral edge of the roof which prevents the brick $x$ from being displaced when the roof is in its upwardly flexed or inverted position. The inertia of the brick decreases the zing or snap of the roof plates, and thus decreases the rapid changes in stress thus set up, and at the same time effectively deadens the noise or sound produced by the flexing or bending of the roof plates when the roof is in motion. The brick $x$ not only deaden the noise and decrease the vibration and snap-like bending of the roof plates during the movement of the roof, but they make it possible to design the roof so that the tank has a greater gas holding capacity. In fact, a breather type roof of the construction above described can be designed so that it has a drop of from 18 inches to 36 inches below the top edge of the side wall of the tank, depending, of course, upon the diameter of the roof, as compared to a drop of from 8 inches to 10 inches in a breather type roof whose top side is not covered with a layer of relatively heavy non-metallic material.

Mounted on the top side of the roof at the center of same is a load $y$ of considerable weight but of relatively small area as compared to the area of the roof. Said weight causes a very slight increase in the internal gas pressure above the actual weight of the roof for every position of the rising roof. When the roof starts to move upwardly, due to an increase in the upward pressure that is exerted on the underside of the roof, the weight $y$ tends to hold the central portion of the roof down on the supporting structure C, with the result that the intermediate portions of the roof lying between the center and the peripheral edge of the roof will flex upwardly, as indicated by the broken lines in Figure 1, thereby causing a pocket or depression to be formed at the center of the roof into which rain water that may be standing on the roof will drain or flow. As the upward pressure on the underside of the roof increases the central portion will rise and said pocket or depression will flatten out, thereby causing the rain water to flow towards the peripheral edge of the roof, and by the time the roof reaches its fully raised or inverted position, all of the rain water has been discharged or expelled towards the peripheral edge of the roof. From the foregoing it will be seen that in a tank roof of the construction above described it is impossible for a considerable volume of rain water standing on the roof to cause a decrease in the gas holding capacity of the tank, by collecting on a portion of the roof located between the center and the peripheral edge, and thus hold said intermediate portion down and prevent it from rising with the remainder of the roof. In my improved roof the load $y$ that is concentrated at the center of the roof insures the roof assuming a definite or approximate shape when the roof rises and causes any rain water that may be standing on the roof to be thrown off of same before the roof rises or flexes upwardly to such a degree that the roof plates become tight or are placed under tension. Consequently, it is not necessary to equip a breather type roof of the construction above described with a drainage system for effecting the removal of rain water from the top side of the roof, the elimination of such a drainage system reducing the cost of building the tank and facilitating the maintenance of the tank in an operative condition. As previously stated, the two features of my invention, to wit, the sound deadening means, formed by the brick or other non-metallic material $x$, and the shape controlling means, formed by the center load $y$, can be used independently of each other, although I prefer to equip the roof with both of said means, as they cooperate with each other to produce a breather type tank roof that will automatically shed rain water which falls on same and which will rise and fall without producing an objectionable noise or sound, even when the roof is designed so that it has a drop far in excess of what heretofore was thought practicable in tank roofs of the breather type.

Having thus described my invention, what I claim as new and desire to secure by Letters Patent is:

1. A storage tank provided with a breather type roof constructed of metal plates, and a means for decreasing the vibrations and hence the resulting sound, produced by the flexing, bending or wrinkling of said roof plates during the movement of the roof.

2. A storage tank provided with a breather type roof constructed of metal plates attached together so as to form in effect a continuous sheet or diaphragm, and a means mounted on the top side of the roof that normally imposes a sufficient load on same to decrease the snap-like bending of the roof plates during the movement of the roof.

3. A tank for storing gases and volatile liquids provided with a metal roof that is capable of flexing and moving upwardly and downwardly relatively to an intermediate horizontal plane so as to vary the volume of the vapor space or gas space of the tank, and a sound deadening and load-producing means mounted on the top side of the roof, designed so as to not interfere with the proper functioning of the roof and not to be injuriously affected by the flexing of the roof.

4. A storage tank provided with a breather type metallic roof whose top surface is covered with a layer of brick arranged so as to not interfere with the proper flexing or bending of the roof plates during the movement of the roof.

5. A storage tank provided with a roof, composed of metal plates connected together so as to form a limber sheet or flexible diaphragm that normally occupies a downwardly deflected position but which is capable of moving upwardly into an inverted position, a layer of material mounted on the top side of the roof so as to decrease the sound or noise produced by the flexing, bending or wrinkling of the roof plates, and a load arranged on the top side of the roof at the center of same for causing the roof to assume such a shape or form during its upward movement that rain water which may be standing on the roof will be expelled from same before the roof plates become tight or are placed under considerable tension.

6. A storage tank provided with a metal roof that is capable of flexing or moving upwardly and downwardly so as to increase and decrease the vapor space or gas space of the tank, a layer of material mounted on the top side of the roof and covering substantially the entire area of same for the purpose described, and a load arranged on the top side of the roof at the center of same of sufficient weight and area to cause the roof to assume a certain approximate shape or form during the upward movement of same.

7. In a tank for storing gases or volatile liquids, the combination of a side wall, a roof constructed in the form of a limber sheet or flexible diaphragm connected at its peripheral edge to said side wall, a supporting structure in the tank for sustaining said roof when it is in its downwardly deflected position, a layer of brick or the like mounted on the top side of the roof, and a rim at the peripheral edge of the roof for preventing displacement of said brick when the roof is in its inverted or upwardly flexed position.

JOHN H. WIGGINS.